Oct. 20, 1953

T. R. SPECHT 2,656,511

POWER MEASURING DEVICE

Filed Nov. 7, 1951

WITNESSES:

INVENTOR
Theodore R. Specht
BY
ATTORNEY

Patented Oct. 20, 1953

2,656,511

UNITED STATES PATENT OFFICE 2,656,511

POWER MEASURING DEVICE

Theodore R. Specht, Greenville, Pa., assignor to Westinghouse Electric Corporation, East Pittsburgh, Pa., a corporation of Pennsylvania Application November 7, 1951, Serial No. 255,251

5 Claims. (Cl. 324—117)

1

This invention relates to direct-current power measuring devices and, in particular, to those power measuring devices which utilize electromagnetic induction apparatus.

For many years, industry has been in need of a power measuring device that will accurately measure direct-current power of high current values. Heretofore, direct-current power has been measured by means of a power measuring device that is connected in circuit relation with the line conductors through which the power to be measured is flowing. When such a power measuring device is employed, a failure in the power measuring device effects an interruption of the power flow through the line conductors. Not only is there an interruption of the power supply, but these prior art power measuring devices utilize a direct-current wattmeter, the accuracy of which is affected by stray direct-current fields. In addition, the direct-current wattmeter is inherently inaccurate.

Other types of direct-current power measuring devices have also been utilized. For instance, when measuring direct-current power of high current value, an ammeter and a voltmeter have been connected across a shunt which is connected in circuit relation with the line conductors carrying the direct-current power. However, when a shunt method is utilized there is a considerable loss of power, thus greatly increasing the cost of operation.

An object of this invention is to provide for deriving and combining a current responsive quantity and a voltage responsive quantity by rendering one of the quantities constant during the time period of the other quantity to effect a highly accurate measurement of direct-current power.

Another object of this invention is to provide for combining the outputs from a suitable voltage transductor and a suitable current transductor connected in circuit relation in a power system to actuate a translating device to produce a highly accurate measurement of direct-current power.

Figure 1:
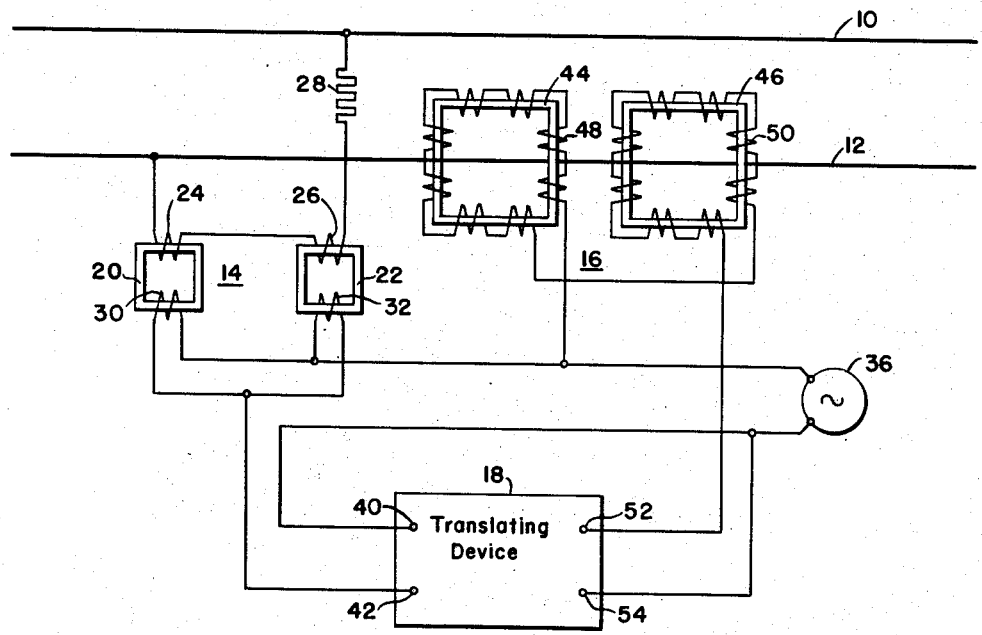
Figure 2:
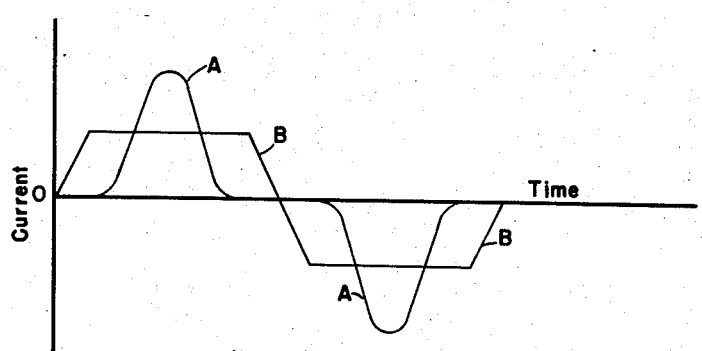

Other objects of this invention will become apparent from the following description when taken in conjunction with the accompanying drawing, in which:

Figure 1 is a schematic diagram of circuits and apparatus embodying the teachings of this invention, and Fig. 2 is a graph representing the output currents from a voltage transductor and a current transductor which illustrate the teachings of this invention.

2

Referring to Fig. 1 of the drawing, there is illustrated a direct-current power measuring device for measuring the power flow through two line conductors 10 and 12. The direct-current power measuring device illustrated in Fig. 1 comprises a voltage transductor 14 and a current transductor 16, connected in circuit relation with a direct-current power system represented by the conductors 10 and 12. As shown, the transductors 14 and 16 are also electrically connected to a translating device 18, such as the conventional alternating-current wattmeter, which responds to their outputs to give a highly accurate measure and indication of the direct-current power flow through the line conductors 10 and 12 as explained hereinafter.

As illustrated, the voltage transductor comprises two magnetic core members 20 and 22 and control coils or windings 24 and 26 disposed in inductive relationship therewith, respectively. In order to vary the saturation of the core members 20 and 22 by magnetic flux, in accordance with the voltage across the line conductors 10 and 12, the control windings 24 and 26 are connected in series circuit relation with a resistor 28 and across the line conductors 10 and 12. The resistor 28 is provided in order to decrease to a minimum, error which may result if the impedance of the control windings 24 and 26 varies with changes in the temperature of the air in contact therewith. The impedance of the resistor 28 is such that substantially all the line voltage appears across it, there being only a small percentage of the voltage across the control windings 24 and 26. However, it is to be understood that if the control windings 24 and 26 are formed from material that is substantially unaffected by changes in temperature, the resistor 28 may be omitted. When the resistor 28 is omitted, the control windings 24 and 26 are connected in series circuit relation and across the line conductors 10 and 12.

In order to produce a current wave shape A, as illustrated in Fig. 2 of the drawing, alternating-current windings or coils 30 and 32 are connected in parallel circuit relation and disposed on the core members 20 and 22, respectively, in inductive relation therewith. As is normally the case in transductors, the alternating-current windings 30 and 32 are disposed in opposed relation on the core members 20 and 22, respectively, for developing opposed fluxes in the core members 20 and 22, to thus produce opposite magnetizing effects thereon. Thus, the alternating current flowing in the windings 30 and 32 will alternately demagnetize one or the other of the core members 20 and 22, respectively. As can be seen from the drawing, the alternating-current windings 30 and 32 receive their alternating-current energy from an alternating-current source 36, one side of the parallel connected windings 30 and 32 being connected to one terminal of the alternating-current source 36 and the other side of the parallel connected windings 30 and 32 being connected to the other terminal of the alternating-current source 36 through terminals 40 and 42 of the translating device 18.

As illustrated, the current transductor 16 comprises magnetic core members 44 and 46, both of which are disposed in inductive relation with the line conductor 12, so that the saturation of the core members 44 and 46 varies in accordance with the magnitude of the direct-current flow through the line conductor 12. In order to obtain a current wave shape B, as illustrated in Fig. 2 of the drawing, a plurality of alternating-current windings 48 and 50 are connected in series circuit relation and disposed on the core members 44 and 46, respectively, in inductive relation therewith. As was the case with the alternating-current windings 30 and 32 of the voltage transductor 14, the alternating-current windings 48 and 50 of the current transductor 16 are disposed on the core members 44 and 46, respectively, in opposed relation so as to produce opposed fluxes therein, and thus have opposite magnetizing effects thereon. Although two alternating-current windings are shown disposed on each leg of the core members 44 and 46, it is to be understood that the number of alternating-current windings needed on each leg of the core members 44 and 46 depends upon the magnitude of direct-current flow through the line conductor 12. The alternating-current windings 48 and 50 are disposed to be electrically connected to the alternating-current source of supply 36, through terminals 52 and 54 of the translating device 18.

In order to obtain a highly accurate measure of the direct-current power flow through the line conductors 10 and 12, it is extremely important that the current flowing through the alternating-current windings 30 and 32 of the voltage transductor 14, as represented by the curve A of Fig. 2, does not start flowing until the current flowing through the alternating-current windings 48 and 50 of the current transductor 16 reaches a maximum and constant value, as represented by the curve B of Fig. 2. It is to be noted that the maximum value of the current, as represented in curve B, is directly proportional to the direct-current flow through the line conductor 12. On the other hand, the average value of the current flow, as represented by the curve A, is directly proportional to the current flow through the control windings 24 and 26 of the voltage transductor 14 and, therefore, directly proportional to the direct-current voltage across the line conductors 10 and 12. Such being the case, any translating device 18 that is capable of measuring the average or integrated current product of the current flow through the alternating-current windings 30 and 32 of the voltage transductor 14, and through the alternating-current windings 48 and 50 of the current transductor 16 will give an accurate indication of the direct-current power flow through the line conductors 10 and 12. For instance, the conventional wattmeter will satisfactorily measure the alternating-current flow through these alternating-current windings 30, 32, 48 and 50. Thermal converter devices that measure power may also be utilized as the translating device 18.

The power measuring device embodying the teachings of this invention operates as follows. If, for instance, there is an increase in the current flow through the line conductors 10 and 12, the increased current flow effects an increase in the saturation of the magnetic core members 44 and 46 of the current transductor 16. The increased saturation of the core members 44 and 46 effect a decrease in the impedance of the alternating-current windings 48 and 50, respectively, thus increasing the current flow to the translating device 18 through the terminals 52 and 54 and proportionately increasing the magnitude of the power indication as given by the translating device 18. On the other hand, if there is a decrease in the current flow through the line conductors 10 and 12, such as to effect a decrease in the saturation of the magnetic core members 44 and 46, the impedance of the alternating-current windings 48 and 50, respectively, will increase, thus effecting a decrease in the current flow to the translating device 18 through the terminals 52 and 54.

As for the voltage transductor 14, an increase in voltage across the line conductors 10 and 12 increases the current flow through the control windings 24 and 26, thus increasing the saturation of the magnetic core members 20 and 22, respectively. An increase in the saturation of the magnetic core members 20 and 22 decreases the impedance of the alternating-current windings 30 and 32, respectively, thus increasing the current flow to the translating device 18 through the terminals 40 and 42. Assuming there is a decrease in the voltage across the line conductors 10 and 12, the current flow through the control windings 24 and 26 will decrease thus effecting a decrease in the saturation of the magnetic core members 20 and 22, respectively. The decreased saturation of the core members 20 and 22 increases the impedance of the alternating-current windings thus decreasing the current flow to the translating device 18 through the terminals 40 and 42 to effect a proportionately smaller indication of power as given by the translating device 18.

The direct-current power measuring device embodying the teachings of this invention has several advantages. For instance, if there is a failure of the power measuring device, the power flow through the line conductors 10 and 12 is not interrupted. In addition, the power measuring device embodying the teachings of this invention is such that it gives an extremely accurate indication of the power flow through the line conductors 10 and 12 when the current flow through the line conductor 12 is either of relatively large magnitude or of relatively small magnitude. It is also to be noted that there is substantially no loss of power in the power measuring device of this invention and thus the cost of operation is extremely low.

In conclusion, it is pointed out that while the illustrated examples constitute practical embodiments of my invention, I do not limit myself to the exact details shown, since the modifications of the same may be considerably varied without departing from the spirit of the invention as defined in the appended claims.

I claim as my invention:

1. In a direct-current power measuring device for measuring the power flowing through two line conductors, the combination comprising, a voltage transductor comprising two magnetic core members, at least one direct-current control winding disposed in inductive relation with each core member, the direct-current control windings being connected in series circuit relation across the two line conductors so as to be responsive to the voltage thereacross, and at least one alternating-current winding disposed in inductive relation with each core member and responsive to an alternating-current supply, the alternating-current windings being connected in parallel circuit relation, a current transductor comprising, two other magnetic core members which are disposed in inductive relation with one of the line conductors so that their magnetic saturation varies in accordance with the direct-current flow through said one of the line conductors, a plurality of other alternating-current windings disposed in inductive relation with each of said two other magnetic core members, said other alternating-current windings being connected in series circuit relation and responsive to the alternating-current supply, and two sets of terminals, one set of terminals being connected in circuit relation with said alternating-current windings of the voltage transductor, the other set of terminals being connected in circuit relation with said alternating-current windings of the current transductor, so as to produce signals at said two sets of terminals that when properly combined will produce an accurate indication of the direct-current power flowing through the two line conductors.

2. In a direct-current power measuring device for measuring the power flow through two line conductors, the combination comprising, a voltage transductor comprising two magnetic cone members, at least one direct-current control winding disposed in inductive relation with each core member, the direct-current control windings being connected in series circuit relation with a resistance member across the two line conductors so as to be responsive to the voltage thereacross, and at least one alternating-current winding disposed in inductive relation with each core member and responsive to an alternating-current supply, the alternating-current windings being connected in parallel circuit relation, a current transductor comprising two other magnetic core members which are disposed in inductive relation with one of the line conductors so that their magnetic saturation varies in accordance with the direct-current flow through said one of the line conductors, a plurality of other alternating-current windings disposed in inductive relation with each of said other two magnetic core members, said other alternating-current windings being connected in series circuit relation and responsive to the alternating-current supply, and two sets of terminals, one set of terminals being connected in circuit relation with said alternating-current windings of the voltage transductor, the other set of terminals being connected in circuit relation with said alternating-current windings of the current transductor, so as to produce signals at said two sets of terminals that when properly combined will produce an indication of the direct-current power flowing through the two line conductors.

3. In a direct-current power measuring device for measuring the power flowing through two line conductors, the combination comprising, a voltage transductor comprising, two magnetic core members, at least one direct-current control winding disposed in inductive relation with each core member, the direct-current control windings being connected in series circuit relation across the two line conductors so as to be responsive to the voltage thereacross, and at least one alterating-current winding disposed in inductive relation with each magnetic core member and responsive to an alternating-current supply, the alternating-current windings being connected in parallel circuit relation, a current transductor comprising, two other magnetic core members which are disposed in inductive relation with one of the line conductors so that their magnetic saturation will vary in accordance with the direct-current flow through said one of the line conductors, a plurality of other alternating-current windings disposed in inductive relation with each of said two other magnetic core members, said other alternating-current windings being connected in series circuit relation and responsive to the alternating-current supply, and a translating device disposed to be responsive to the current flow through said alternating-current windings of the voltage transductor and the current flow through said alternating-current windings of the current transductor, so as to produce an accurate indication of the direct-current power flow through the two line conductors.

4. In a direct-current power measuring device for measuring the power flowing through two line conductors, the combination comprising, a voltage transductor comprising two magnetic core members, at least one direct-current control winding disposed in inductive relation with each magnetic core member, the direct-current control winding being connected in series circuit relation with a resistance member across the two line conductors so as to be responsive to the voltage thereacross, and at least one alternating-current winding disposed in inductive relation with each magnetic core member, the alternating-current windings being connected in parallel circuit relation and responsive to an alternating-current supply, a current transductor comprising two other magnetic core members which are disposed in inductive relation with one of the line conductors so that their magnetic saturation varies in accordance with the direct-current flow through said one of the line conductors, a plurality of other alternating-current windings disposed in inductive relation with each of said two other magnetic core members, said other alternating-current windings being connected in series circuit relation and responsive to the alternating-current supply, and an alternating-current wattmeter disposed to be responsive to the current flow through said alternating-current windings of the voltage transductor and the current flow through said alternating-current windings of the current transductor, so as to produce an accurate indication of the direct-current power flow through the two line conductors.

5. In a direct-current power measuring device for measuring the power flowing through two line conductors, the combination comprising, a voltage transductor comprising two magnetic core members, at least one direct-current control winding disposed in inductive relation with each magnetic core member, the direct-current control windings being connected in series circuit relation across the two line conductors so as to be responsive to the voltage thereacross, and at least one alternating-current winding disposed in inductive relation with each magnetic core member in opposed relation for developing fluxes in the magnetic core members that have opposite magnetizing effects thereon, the alternating-current windings being connected in parallel circuit relation and being responsive to an alternating-current supply, a current transductor comprising, two other magnetic core members which are disposed in inductive relation with one of the line conductors so that their magnetic saturation varies in accordance with the direct-current flow through one of said line conductors, a plurality of other alternating-current windings disposed in inductive relation with each of said two other magnetic core members in opposed relation for developing opposed fluxes in said two other magnetic core members to thus have opposite magnetizing effects thereon, said other alternating-current windings being connected in series circuit relation and responsive to the alternating-current supply, and a translating device disposed to be responsive to the current flow through the alternating-current windings of the voltage transductor and to the current flow through the alternating-current windings of the current transductor, so as to produce an accurate indication of the direct-current power flow through the two line conductors.

THEODORE R. SPECHT.

References Cited in the file of this patent

UNITED STATES PATENTS

| Number | Name | Date |
|---|---|---|
| 1,299,252 | Slepian | Apr. 1, 1919 |
| 1,524,285 | Besag | Jan. 27, 1925 |
| 1,825,514 | Fitzgerald | Sept. 29, 1931 |
| 2,338,423 | Geyger | Jan. 4, 1944 |